(12) United States Patent
Benham et al.

(10) Patent No.: US 8,809,472 B2
(45) Date of Patent: Aug. 19, 2014

(54) PROCESS OF MELT INDEX CONTROL

(75) Inventors: Elizabeth A. Benham, Spring, TX (US); Charles R. Nease, Kingwood, TX (US); Max P. McDaniel, Bartlesville, OK (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 784 days.

(21) Appl. No.: 13/094,408

(22) Filed: Apr. 26, 2011

(65) Prior Publication Data

US 2012/0277386 A1    Nov. 1, 2012

(51) Int. Cl.
| | |
|---|---|
| *C08F 4/24* | (2006.01) |
| *C08F 4/62* | (2006.01) |
| *C08F 10/14* | (2006.01) |
| *C08F 10/04* | (2006.01) |
| *C08F 10/00* | (2006.01) |
| *C08F 210/16* | (2006.01) |

(52) U.S. Cl.
CPC ............... *C08F 210/16* (2013.01); *C08F 10/00* (2013.01)
USPC ...... 526/104; 526/105; 526/348.7; 526/348.2; 526/348.6; 526/348.5

(58) Field of Classification Search
CPC .......... C08F 10/00; C08F 210/16; C08F 2/38; C08F 4/78; C08F 210/08; C08F 2500/07; C08F 2500/12; C08F 210/14
USPC ................ 526/104, 105, 348.2, 348.5, 348.6, 526/348.7
See application file for complete search history.

(56) References Cited

U.S. PATENT DOCUMENTS

| | | | |
|---|---|---|---|
| 3,248,179 A | 4/1966 | Norwood | |
| 3,562,241 A * | 2/1971 | Witt | ............................... 526/106 |
| 4,177,162 A | 12/1979 | McDaniel et al. | |
| 4,247,421 A | 1/1981 | McDaniel et al. | |
| 4,501,885 A | 2/1985 | Sherk et al. | |
| 4,564,839 A | 1/1986 | Powell | |
| 4,588,790 A | 5/1986 | Jenkins, III et al. | |
| 4,803,253 A | 2/1989 | McDaniel et al. | |
| 5,352,749 A | 10/1994 | DeChellis et al. | |
| 5,436,304 A | 7/1995 | Griffin et al. | |
| 5,455,314 A | 10/1995 | Burns et al. | |
| 5,565,175 A | 10/1996 | Hottovy et al. | |
| 5,575,979 A | 11/1996 | Hanson | |
| 6,239,235 B1 | 5/2001 | Hottovy et al. | |
| 6,262,191 B1 | 7/2001 | Hottovy et al. | |
| 6,833,415 B2 | 12/2004 | Kendrick et al. | |

OTHER PUBLICATIONS

McDaniel, M. P., et al., "Poisoning Studies on Cr/Silica. 2. Carbon Monoxide," J. Phys Chem., 1991, vol. 95, pp. 3289-3293, American Chemical Society.
Smith, J.M., Chemical Engineering Kinetics, 3rd edition, Jan. 1, 1981, pp. 18, 44-46, McGraw Hill Publishers.

* cited by examiner

*Primary Examiner* — William Cheung
(74) *Attorney, Agent, or Firm* — Conley Rose, P.C.; Rodney B. Carroll; Monte R. Rhodes

(57) ABSTRACT

A method comprising contacting an olefin in the presence of a catalyst and a melt index modifier (MIM) under conditions suitable to form a polyolefin and recovering the polyolefin, wherein the polyolefin melt index is increased by at least about 25%, wherein the normalized catalyst activity is decreased by less than about 10%, and wherein the MIM is characterized by the general formula $R^1$—HC=CH—$R^2$ or $R^3R^4C$=$CH_2$ where $R^1$, $R^2$, $R^3$, $R^4$ are each selected from the group consisting of a non-aromatic organyl group.

18 Claims, 2 Drawing Sheets

PROCESS OF MELT INDEX CONTROL

CROSS-REFERENCE TO RELATED APPLICATIONS

Not applicable.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

FIELD OF THE INVENTION

The present disclosure relates to polymers and articles made from same. More particularly the present disclosure relates to a method to prepare polymer compositions displaying modified melt indices.

BACKGROUND OF THE INVENTION

Polyolefins are plastic materials useful for making a wide variety of valued products due to their combination of stiffness, ductility, barrier properties, temperature resistance, optical properties, availability, and low cost. In particular, polyethylene (PE) is the one of the largest volume polymers consumed in the world. It is a versatile polymer that offers high performance relative to other polymers and alternative materials such as glass, metal, or paper. Polymer compositions such as, for example, PE compositions are used for the production of a wide variety of articles ranging from plastic films to drums and tanks. Plastic films such as PE films are mostly used in packaging applications, but they also find utility in the agricultural, medical, and engineering fields. PE films are manufactured in a variety of grades that are usually differentiated by the polymer density, for example, low density polyethylene (LDPE), medium density polyethylene (MDPE), and high density polyethylene (HDPE), wherein each density range has a combination of properties making it suitable for a particular application.

The melt index (MI) of a polymer may provide a simple indicator of resin processability and end-use performance. The processability and end-use performance are factors to be considered in the polymer's suitability for use in a particular application. Particularly, the MI is related to the ease of extrusion of the resin during fabrication and is further an indirect comparative measurement of the head pressure generated by the melt extrusion of the polymer in an extruder. For example, higher MI polymers are typically amenable to plastic shaping processes such as injection molding whereas lower MI polymers are typically amenable to plastic shaping processes such as blow molding or extrusion. Consequently, it would be desirable to modify the melt index of a polymer and likewise polymeric compositions comprising the polymer, thereby adjusting its suitability for a particular application.

Some common variables for controlling melt index are through adjustments of the reactor temperature, modification of the ethylene concentration, and/or the inclusion of hydrogen in the polymerization process. There are drawbacks associated with the use of the aforementioned variables for controlling melt index. For example, raising the reactor temperature will, at some point, cause fouling while lowering the ethylene concentration can result in a lower catalyst productivity. Further the drawbacks associated with the addition of hydrogen can be twofold in that the addition of hydrogen both increases the saturation pressure in the reactor which is typically compensated for by the addition of less ethylene monomer and may cause poor circulation and fouling within the reactor. Thus, there is a need to develop a method for modifying the MI that overcomes these shortcomings.

BRIEF SUMMARY OF THE INVENTION

Disclosed herein is a method comprising contacting an olefin in the presence of a catalyst and a melt index modifier (MIM) under conditions suitable to form a polyolefin and recovering the polyolefin, wherein the polyolefin melt index is increased by at least about 25%, wherein the normalized catalyst activity is decreased by less than about 10%, and wherein the MIM is characterized by the general formula $R^1$—HC=CH—$R^2$ or $R^3R^4C$=$CH_2$ wherein $R_1$, $R_2$, $R_3$, $R_4$ are each selected from the group consisting of a non-aromatic organyl group.

Also disclosed herein is a process for adjusting a melt index of a polymer made by polymerization in a reactor system comprising polymerizing a monomer and a comonomer in the presence of a catalyst, a diluent, and a melt index modifier to produce the polymer, wherein said melt index modifier is used in an amount effective to modify the melt index of the polymer; lower the normalized catalyst activity by less than about 10%; increase the saturation pressure in the polymerization reactor by less than about 20%; and lower the polymer density by less than 0.01 g/mL.

DETAILED DESCRIPTION OF THE INVENTION

Figure 1:
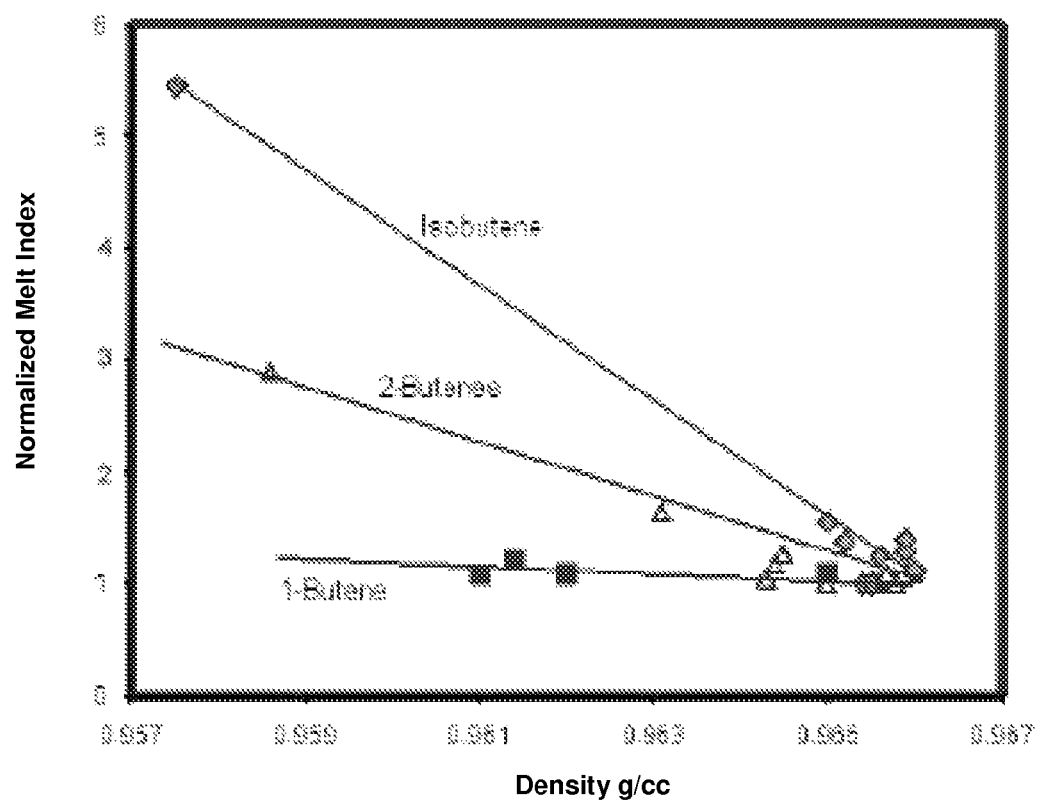
FIG. 1 is a plot of the melt index as a function of density for the samples from Example 1.

Disclosed herein are polymers, polymeric compositions, polymeric articles and methods of making and using same. Such methods may comprise preparing a polymer or polymeric composition and forming an article therefrom. In an embodiment, the polymer and/or polymeric composition comprises polyethylene or a copolymer thereof. A polymeric composition generally refers to at least one polymer and one or more additional components (e.g., a second polymer, additive, etc. . . . ). Polymers and/or polymeric compositions of the type described herein may display modified mechanical properties such as, for example, a modified MI. Hereinafter, such polymers and polymeric compositions are collectively termed melt index modified polymers/polymeric compositions (MIMP).

The MIMP described herein may be prepared by any suitable means, for example, by employing one or more catalyst systems in one or more reactors, as will be described in more detail herein.

In an embodiment, the MIMP may comprise any polymeric material suitable with the components and processes of this disclosure. For example, the MIMP may comprise a polyolefin. In some embodiments, the MIMP comprises a polyethylene (PE) homopolymer, a polyethylene copolymer, or blends thereof. The PE may be further characterized as a high-density polyethylene (HDPE), alternatively a linear low-density polyethylene (LLDPE), or alternatively blends thereof. Herein and after, this disclosure will refer to a MIMP comprising PE.

In an embodiment, a method of preparing a MIMP of the type described herein comprises contacting a monomer and optionally one or more comonomers with a catalyst system under conditions suitable for the formation of the MIMP. Any catalyst system compatible with and able to produce polymer compositions having the features disclosed herein may be employed. Catalyst compositions that can be employed include without limitation supported chromium catalysts, Ziegler-Natta catalysts, metallocene catalysts, or combinations thereof. In an embodiment, the catalyst system comprises a chromium/silica/titania catalyst (i.e., Cr/Si/Ti catalyst). Such catalysts are described in more detail, for example, in U.S. Pat. Nos. 4,247,421; 4,177,162; 4,564,839; and 4,803,253 each of which is incorporated by reference in its entirety.

The methods disclosed herein for preparation of a MIMP may be carried out using various types of polymerization reactors. As used herein, "polymerization reactor" includes any polymerization reactor capable of polymerizing olefin monomers to produce homopolymers or copolymers. Such homopolymers and copolymers are referred to as resins or polymers.

The various types of reactors include those that may be referred to as batch, slurry, gas-phase, solution, high pressure, tubular or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of un-reacted monomer, un-reacted comonomer, and/or diluent.

Polymerization reactor systems of the present disclosure may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high pressure reactors or a combination of high pressure with loop and/or gas reactors. The multiple reactors may be operated in series or in parallel.

According to one aspect of the disclosure, the polymerization reactor system may comprise at least one loop slurry reactor comprising vertical or horizontal loops. Monomer, diluent, catalyst and optionally any comonomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or comonomer. Various technologies may be used for this separation step including, but not limited to, flashing that may include any combination of heat addition and pressure reduction; separation by cyclonic action in either a cyclone or hydrocyclone; or separation by centrifugation.

A typical slurry polymerization process (also known as the particle form process), is disclosed, for example, in U.S. Pat. Nos. 3,248,179; 4,501,885; 5,565,175; 5,575,979; 6,239,235; 6,262,191; and 6,833,415, each of which is incorporated by reference herein in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this disclosure, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749; 4,588,790; and 5,436,304, each of which is incorporated by reference herein in its entirety.

According to still another aspect of the disclosure, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the disclosure, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs Free energy equation. Typically this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1000 pound-force per square inch gauge (psig). Pressure for gas phase polymerization is usually at about 200 to about 500 psig. High pressure polymerization in tubular or autoclave reactors is generally run at about 20,000 to about 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, crack growth, long chain branching and rheological measurements. In addition, the concentration of poisons is minimized because poisons impact the reactions and product properties.

In an embodiment, a method for modifying the melt index of a MIMP comprises contacting a monomer and optionally one or more comonomers in the presence of a catalyst system, both of the type described herein, with a melt index modifier (MIM) under conditions suitable to form a MIMP and recovering the MIMP. Suitable polymerization process conditions such as temperatures, pressures and times may be impacted by a number of factors such as the nature and amount of catalyst system utilized and/or desired product purity among others. The concentration of the catalyst utilized may be any concentration suitable to produce the desired polymerization product (i.e., MIMP). The reaction temperature of the polymerization reaction may be any reaction temperature suitable to produce the desired polymerization product. In some embodiments, the reaction temperature for the polymerization reaction may range from −20° C. to 200° C. In some embodiments, the polymerization temperature ranges from 0° C. to 150° C.; alternatively, ranges from 10° C. to 150° C.; alternatively, ranges from 20° C. to 110° C.; or alternatively, ranges from 60° C. to 105° C. The reaction pressure of the polymerization reaction may be any reaction pressure suitable to produce the desired polymerization product. In some embodiments, the polymerization pressure may be greater than or equal to 1 psig (6.9 kPa); alternatively, greater than or equal to 50 psig (344 kPa); alternatively, greater than or equal to 100 psig (689 kPa); or alternatively, greater than or equal to 150 psig (1.0 MPa). In other embodiments, the polymerization pressure may range from 1 psig (6.9 kPa) to 5,000 psig (34.5 MPa); alternatively, 50 psig (344 kPa) to 4,000 psig (27.6 MPa); alternatively, 100 psig (689 kPa) to 3,000 psig (20.9 MPa); or alternatively, 150 psig (1.0 MPa) to 2,000 psig (13.8 MPa). In embodiments wherein the monomer is a gas (e.g., ethylene), the polymerization may be carried out under a monomer gas pressure. In some embodiments, the ethylene pressure may be greater than or equal to 1 psig (6.9 kPa); alternatively, greater than or equal to 50 psig (344 kPa); alternatively, greater than or equal to 100 psig (689 kPa); or alternatively, greater than or equal to 150 psig (1.0 MPa). In other embodiments, the ethylene pressure may range from 1 psig (6.9 kPa) to 5,000 psig (34.5 MPa); alternatively, 50 psig (344 kPa) to 4,000 psig (27.6 MPa); alternatively, 100 psig (689 kPa) to 3,000 psig (20.9 MPa); or alternatively, 150 psig (1.0 MPa) to 2,000 psig (13.8 MPa). In some cases when ethylene is the monomer, inert gases may form a portion of the total reaction pressure. In the cases where inert gases form a portion of the reaction pressure, the previously stated ethylene pressures may be the applicable ethylene partial pressures of the polymerization reaction. The reaction time of the polymerization reaction may be any reaction time suitable to produce the desired quantity of polymerization product, obtain a desired catalyst productivity, and/or obtain a desired conversion of monomer. In some embodiments, the polymerization reaction time may range from 1 minute to 8 hours; alternatively, from 5 minutes to 5 hours; alternatively, from 10 minutes to 2.5 hours; or alternatively, from 15 minutes to 2 hours.

Herein, a MIM refers to any material compatible with the disclosed processes and components and able to alter the melt index of the polymer composition while maintaining a desired catalytic activity when used in a polymerization reaction. That is, the MIM may be further characterized by its effect on the activity of the catalyst or catalyst system. A MIM suitable for use in this disclosure may produce a minimal loss in activity when used in the disclosed concentration ranges. For example, a suitable MIM may produce a catalyst activity of equal to or greater than about 80% of a catalyst tested in the absence of a MIM; alternatively equal to or greater than about 90%; alternatively equal to or greater than about 95%. Herein, catalyst activity refers to the grams of polymer produced per gram of solid catalyst charged per hour. Herein, the normalized catalyst activity is obtained by determining the catalyst activity in the absence of the MIM, denoted x, and dividing the catalyst activity in the presence of the MIM by x.

A MIM suitable for use in this disclosure may be further characterized by the degree to which it is incorporated into the MIMP. The degree to which the MIM is incorporated into the MIMP refers to the extent in which the MIM acts as a comonomer and bonds to the growing polymer chain. Herein, the extent to which the MIM is incorporated into the MIMP is measured in terms of the amount of MIM consumed in the polymerization reaction per pass, excluding recovery and recycle. In an embodiment, the MIM consumption is less than about 15%, alternatively less than about 10%, alternatively less than about 7%. The amount of MIM consumed may be determined via measuring the amount of MIM in the diluent upon exit from the reactor, divided by the amount of MIM (or concentration) in the diluent upon addition to the reactor multiplied by 100%.

A MIM suitable for use in this disclosure may further be characterized by its effect on the saturation pressure of the reactor system during the polymerization reaction. In an embodiment, a MIM of the present disclosure may not substantively alter the saturation pressure, or bubble point, of the reactor system. In an embodiment, the vapor pressure of the MIM may not exceed the vapor pressure of the diluent by more than about 20%, alternatively by more than about 10%, or alternatively by more than about 5%. In a slurry reactor, the diluent may typically comprise isobutane. In a gas phase reaction, the partial pressure of the MIM may not be as high as the partial pressure of a similar molar concentration of ethylene. In an embodiment, in a gas phase reaction, the partial pressure of the MIM may be less than about 50%, alternatively less than about 25%, alternatively less than about 10%, alternatively less than about 5% of the partial pressure of an equal molar amount of ethylene.

In an embodiment, the MIM can be a compound represented by Formula I or Formula II:

$$R^1-HC=CH-R^2 \quad \text{(Formula I)}$$

$$R^3R^4C=CH_2 \quad \text{(Formula II)}$$

Generally, $R^1$, $R^2$, $R^3$, and $R^4$ are each independent elements of the compounds of Formula I and Formula II. In an embodiment, each R can be different. In some embodiments, each R can be the same. In an embodiment, each R can independently comprise an organyl group. In other embodiments, each R can independently be a $C_1$ to $C_{20}$ organyl group; alternatively, a $C_1$ to $C_{10}$ organyl group; or alternatively, a $C_1$ to $C_5$ organyl group. In other embodiments, each R can independently be a $C_1$ to $C_{20}$ hydrocarbyl group; alternatively, a $C_1$ to $C_{10}$ hydrocarbyl group; or alternatively, a $C_1$ to $C_5$ hydrocarbyl group. The term "organyl group" is used herein in accordance with the definition specified by IUPAC: an organic substituent group, regardless of functional type, having one free valence at a carbon atom. An "organyl group," can be aliphatic, inclusive of being cyclic or acyclic. "Organyl groups," can be linear or branched unless otherwise specified. Finally, it is noted that the "organyl group," definitions include "hydrocarbyl group," "hydrocarbon group," respectively, and "alkyl group," and "alkane group," respectively, as members. In an embodiment, $R^1$, $R^2$, $R^3$, and $R^4$ exclude an aromatic group.

Examples of MIMs suitable for use in this disclosure include 2-butene, isobutene or a combination thereof. In an embodiment, the MIM comprises 2-butene which comprises a mixture of the cis and trans isomers.

In an embodiment, the MIM is used in an amount effective to modify the melt index of the MIMP; alter the catalyst activity by the range of values disclosed herein; and alter the saturation pressure in the polymerization reactor by the range of values disclosed herein. The MIM may be present in an amount from about 1 weight part per million (wppm) to about 10,000 wppm, alternatively from about 10 wppm to about 5,000 wppm, alternatively from about 100 wppm to about 10,000 wppm. Weight part per million (wppm) denotes the relative proportion of one part by weight per million parts by weight examined based on the diluent or solvent, or in the case of gas phase reactors on the total monomer content.

A MIM suitable for use in this disclosure may further be characterized by its effect on the resin density. In an embodiment, the MIMP (e.g., polyethylene) is characterized by a change in density of less than about 0.01 g/mL, alternatively by less than about 0.08 g/mL, alternatively by less than about 0.05 g/mL, when compared to a polymer composition produced under otherwise similar conditions in the absence of the MIM. The MIM may alternatively be characterized by its effect on both the MI and resin density. For example, the MIM may increase the MI by equal to or greater than about 25%, alternatively by equal to or greater than about 50%, alternatively by equal to or greater than about 75%, alternatively by an equal to or greater than about 100% when compared to an otherwise similar polymer prepared in the absence of a MIM, while decreasing the density by less than about 0.05 g/mL.

In an embodiment, the shear response of the MIMP may differ from the shear response of an otherwise similar polymer composition prepared in the absence of a MIM by equal to or less than about 15%, alternatively by equal to or less than about 50%, alternatively by equal to or less than about 5%. The shear response refers to the ratio of high load melt index to melt index (HLMI/MI) of the MIMP. The HLMI refers to refers to the amount of a polymer which can be forced through an extrusion rheometer orifice of 0.0825 inch diameter when subjected to a force of 2160 grams in ten minutes at 190° C., as determined in accordance with ASTM D 1238.

MIMPs produced as disclosed herein may be formed into articles of manufacture or end use articles using any suitable methodology such as, for example, extrusion, blow molding, injection molding, fiber spinning, thermoforming, and casting. For example, the MIMP may be extruded into a sheet, which is then thermoformed into an end use article such as a container, a cup, a tray, a pallet, a toy, or a component of another product. In another example, the MIMPs produced as described herein (e.g., polyethylene) may be formed into films.

A MIMP produced as disclosed herein may display an altered melt index when compared to an otherwise similar polymer prepared in the absence of a MIM. In an embodiment, the MIMP comprises a polyethylene homopolymer or polyethylene copolymer and the MIM used in the production of the MIMP comprises 2-butene or isobutene present in an amount of from about 100 wppm to about 1000 wppm. In such embodiments, the consumption of the MIM during formation of the MIMP may be from about 1% to about 10%. In such embodiments, the activity of the catalyst used in formation of the MIMP may decrease by about 0% to about 10%. In such embodiments, the MI of the MIMP may increase from about 25% to equal to or greater than about 100%. In such embodiments, the MI of the MIMP may range from about 0.1 dg/min to about 100 dg/min, alternatively from about 0.1 dg/min to about 75 dg/min, alternatively from about 0.1 dg/min to about 50 dg/min.

EXAMPLES

The disclosure having been generally described, the following examples are given as particular embodiments of the disclosure and to demonstrate the practice and advantages thereof. It is understood that the examples are given by way of illustration and are not intended to limit the specification of the claims to follow in any manner. In embodiments, the polymer compositions produced in the presence of a MIM display a modified melt index when compared to a polymer composition produced in otherwise similar conditions in the absence of the MIM.

In the following examples, the MI and HLMI were determined in accordance with ASTM D 1238 at 190° C. Normalized MI was determined by dividing the MI of a resin produced according to the methods disclosed herein by the MI of a resin produced by otherwise similar methods in the absence of a MIM.

Polymer density was determined in grams per cubic centimeter (g/cc) on a compression molded sample, cooled at about 15° C. per hour, and conditioned for about 40 hours at room temperature in accordance with ASTM D 1505 and ASTM D 1928, procedure C.

Normalized catalyst activity was determined by dividing the catalyst activity during production of a resin according to the methods disclosed herein by the catalyst activity during production of a resin by otherwise similar methods in the absence of a MIM.

Molecular weights and molecular weight distributions were obtained by gel permeation chromatography. Consumption of the MIM was measured by comparing the amount of a MIM material present before the reaction to the amount of the material present after the reaction.

Example 1

The effects of the presence of a MIM as compared to the effects of the presence of a comonomer during the polymerization of ethylene to polyethylene were investigated. Polymer resins with modified MI values, designated sample series S1 and S2, were produced in the presence of a MIM and the absence of a comonomer, according to the methods disclosed herein and tested for their properties. Specifically sample series S1 and S2 were produced in the presence of 2-butene or isobutene, respectively. A comparative resin series, designated sample C1, was produced in the absence of a MIM and the presence of a comonomer, 1-butene, and was also tested for its properties. 1-butene is a comonomer commonly used to lower polymer density. The catalyst used was a Magnapore commercial chromium based catalyst obtained from W. R. Grace and activated at 870° C.

Polymerization runs were made in a 2.2 liter steel reactor equipped with a marine stirrer rotating at 400 rpm. The reactor was surrounded by a steel jacket containing boiling methanol with a connection to a steel condenser. The boiling point of the methanol was controlled by varying nitrogen pressure applied to the condenser and jacket, which permitted precise temperature control to within half a degree centigrade, with the help of electronic control instruments.

A small amount (0.01 to 0.10 grams normally) of the solid catalyst was first charged under nitrogen to the dry reactor. Next 1.2 liters of isobutane liquid was charged and the reactor heated up to the specified temperature, either 109° C. or 105° C. Finally, ethylene was added to the reactor to equal a fixed pressure, normally 550 psig, which was maintained during the experiment. The stirring was allowed to continue for the specified time, usually around one hour, and the activity was noted by recording the flow of ethylene into the reactor to maintain the set pressure.

After the allotted time, the ethylene flow was stopped and the reactor slowly depressurized and opened to recover a granular polymer powder. In all cases the reactor was clean with no indication of any wall scale, coating or other forms of fouling. The polymer powder was then removed and weighed. Activity was specified as grams of polymer produced per gram of solid catalyst charged per hour.

Table 1 summarizes the properties of the sample series C1, S1, and S2 and presents the amount in parts-per-million (ppm) of additive material used (relative to the isobutane diluent), melt index (MI), density, activity, normalized melt index (Norm MI) and normalized activity (Norm Activity). The normalized melt index and normalized activity are obtained by diving the melt index or activity observed for the particular sample in the presence of the indicated amount of additive material by the melt index and activity observed in the absence of the additive material.

TABLE 1

| Resin Series | Temp. | ppm additive | MI | Density | Activity | Norm MI | Norm Activity | HLMI/MI |
|---|---|---|---|---|---|---|---|---|
| C1, comparative | 109° C. | 0 | 5.2 | 0.9656 | 6130 | 1.00 | 1.00 | 40 |
| C1 | 109° C. | 140 | 5.6 | 0.9620 | 5850 | 1.08 | 0.95 | 40 |
| C1 | 109° C. | 300 | 5.7 | 0.9620 | 5450 | 1.10 | 0.89 | 39 |
| C1 | 109° C. | 560 | 6.3 | 0.9614 | 4320 | 1.21 | 0.70 | 39 |
| C1 | 109° C. | 750 | 5.6 | 0.9610 | 3950 | 1.08 | 0.64 | 41 |
| C1 | 105° C. | 0 | 1.2 | 0.9657 | 8200 | 1.00 | 1.00 | 57 |
| C1 | 105° C. | 560 | 1.3 | 0.9650 | 8850 | 1.10 | 1.08 | 45 |
| S1 | 109° C. | 0 | 5.1 | 0.9658 | 6360 | 1.00 | 1.00 | 42 |
| S1 | 109° C. | 60 | 5.6 | 0.9660 | 6450 | 1.10 | 1.01 | 44 |
| S1 | 109° C. | 140 | 5.3 | 0.9643 | 5100 | 1.04 | 0.80 | 41 |
| S1 | 109° C. | 180 | 5.9 | 0.9644 | 6300 | 1.16 | 0.99 | 39 |
| S1 | 109° C. | 320 | 5.5 | 0.9659 | 5040 | 1.08 | 0.79 | 39 |
| S1 | 109° C. | 530 | 5.5 | 0.9657 | 5520 | 1.08 | 0.87 | 40 |
| S1 | 109° C. | 880 | 8.3 | 0.9631 | 6030 | 1.63 | 0.95 | 37 |
| S1 | 105° C. | 0 | 1.9 | 0.9650 | 8200 | 1.00 | 1.00 | 57 |
| S1 | 105° C. | 560 | 2.4 | 0.9645 | 8320 | 1.26 | 1.01 | 44 |
| S1 | 105° C. | 3500 | 5.5 | 0.9586 | 4590 | 2.89 | 0.56 | 42 |
| S2 | 109° C. | 0 | 5.3 | 0.9654 | 6620 | 1.00 | 1.00 | 40 |
| S2 | 109° C. | 90 | 5.9 | 0.9660 | 5670 | 1.11 | 0.86 | 39 |
| S2 | 109° C. | 190 | 8.2 | 0.9650 | 5810 | 1.55 | 0.88 | 36 |
| S2 | 109° C. | 550 | 6.8 | 0.9659 | 4840 | 1.28 | 0.73 | 37 |
| S2 | 109° C. | 1060 | 7.4 | 0.9659 | 4920 | 1.40 | 0.74 | 37 |
| S2 | 105° C. | 0 | 2.4 | 0.9655 | 8320 | 1.00 | 1.00 | 58 |
| S2 | 105° C. | 560 | 3.0 | 0.9656 | 8490 | 1.25 | 1.02 | 46 |
| S2 | 105° C. | 900 | 3.3 | 0.9652 | 8180 | 1.38 | 0.98 | 48 |
| S2 | 105° C. | 10000 | 13.1 | 0.9575 | 6240 | 5.45 | 0.75 | 42 |

It was observed that for sample series C1, introduction of the additive 1-butene to the polymerization process invariably decreased the density of the resin with a concomitant increase in MI. For C1, at 109° C., the activity of the catalyst was observed to decrease as 1-butene was added. This was attributed to localized fouling of the catalyst due to swollen polymer and was not observed at 105° C. This result demonstrates that the additive 1-butene was not functioning as a MIM.

In contrast, sample series S1, which was produced in the presence of the additive 2-butene, exhibited a greater increase in MI and with a concomitantly negligible decrease in density or catalyst activity as compared to sample series C1. This result demonstrates that the additive 2-butene was functioning as a MIM. The slight loss in activity at 109° C., as MIM was added, was again attributed to localized fouling, as it did not happen at 105° C. Note that for a given concentration of olefin, the S1 series produced a higher activity than the C1 series. Note also that there was no loss in activity at 105° C. and 560 ppm even though the MI potential increased by 26%, and that there was only minimal drop in density. The loss in activity at 105° C. and 3500 ppm suggests that for this MIM, 3500 ppm may be too high a concentration.

Sample series S2, which was produced in the presence of the additive isobutene exhibited the greatest increase in MI with a concomitantly negligible decrease in polymer density or catalyst activity as compared to Sample series C1. This result demonstrates that the additive isobutene was functioning as a MIM. At 109° C., a loss in activity was again observed as MIM was added to the reactor, and this was again attributable to localized fouling. Note that for a given concentration of olefin, the S2 series produced higher activity than the C1 series. However, at 105° C. up to 900 ppm of S2 was added with almost no drop in catalyst activity or polymer density.

In FIG. 1, the normalized MI is plotted as a function of the resin density for resins C1, S1 and S2. The results demonstrate the increase in MI that can be obtained with these different compounds as a function of the lost density. S1 and S2 yield a greater enhancement in melt index for a given drop in density.

Figure 2:
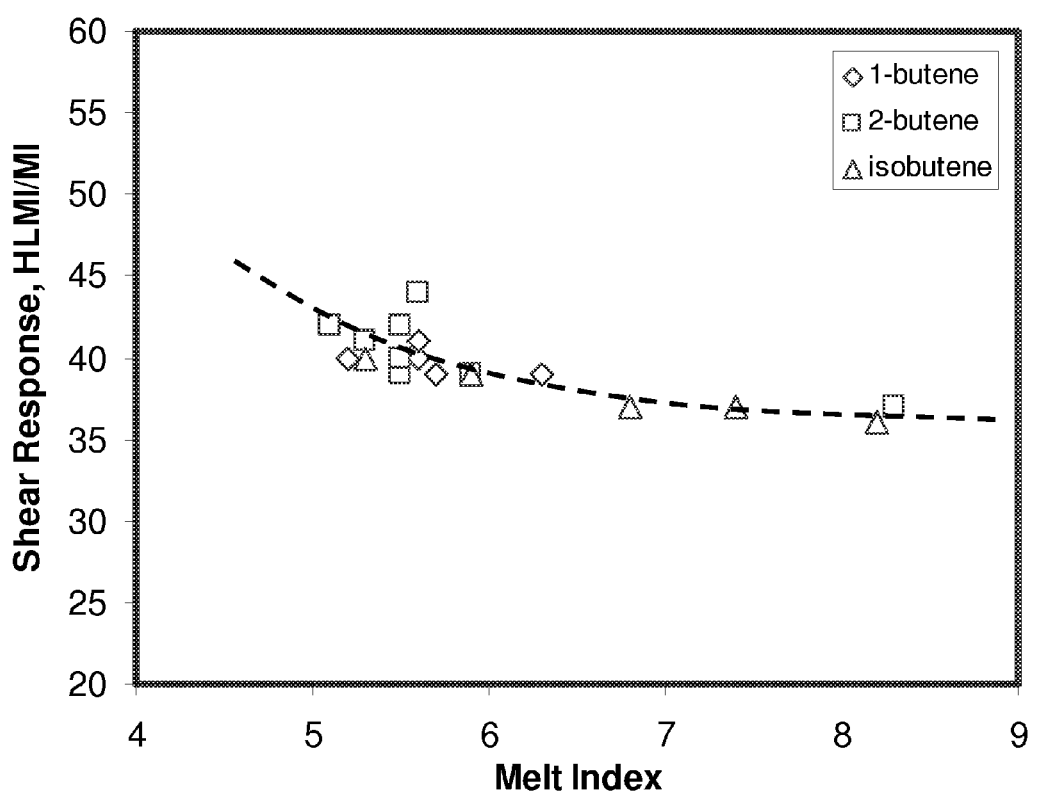
FIG. 2 is a plot of shear response as a function of melt index for the samples from Example 1.

Shear response was not observed to be greatly affected in any of the resins S1, S2, and C1. The shear response from these polymerization tests is plotted against MI in FIG. 2. The position of the data points associated with resins S1 and S2 in relationship to the data points associated with resin C1 indicates that there is no significant change in shear response as a result of the MIM compared to resin C1.

Example 2

The effects of the presence of a MIM on the MI of a polymer were investigated. A polymer sample designated sample S3, was produced in the presence of 1000 ppm isobutene according to the methods disclosed herein and tested for its properties. A comparative resin, designated sample C2, was produced in the absence of a MIM and was also tested for its properties. The catalyst used was a 969 MS commercial chromium based catalyst, obtained from W. R. Grace, and was activated at 705° C. The polymerization was carried out as described in Example 1. Table 2 summarizes the properties of the samples C2 and S3.

TABLE 2

| Resin | Density | MI | HLMI | HLMI/MI | % Consumed |
|---|---|---|---|---|---|
| C2 | 0.9619 | 0.22 | 18.5 | 84.1 | NA |
| S3 | 0.9621 | 0.49 | 36.1 | 73.7 | 4.2% |

The results demonstrate that S3 produced in the presence of a MIM (i.e., isobutene) displayed marked alterations in MI and HLMI with a concomitantly negligible alteration in density. Particularly, the MI displayed by sample S3 was more than double the MI displayed by sample C2. Further, in the case of sample S3, the amount of isobutene consumed in the reactor was only 4%. The small change in density coupled with the small amount of 2-isobutene consumed during the polymerization reactions suggests a low incorporation of isobutene in resin S3. In Table 2, the shear response (HLMI/MI) is also shown for each resin. The S3 displayed a slightly narrower (lower) shear response. As shown in FIG. 1, this is the normal behavior when the melt index is increased by any means, such as by raising temperature or by adding hydrogen.

In one embodiment is disclosed a method, comprising contacting an olefin, a catalyst, and at least one melt index modifier (MIM) in a polymerization reactor under conditions suitable to form a polyolefin and recovering the polyolefin. In another embodiment is disclosed a method, comprising contacting an olefin, a catalyst, a diluent and at least one melt index modifier (MIM) in a polymerization reactor under conditions suitable to form a polyolefin and recovering the polyolefin. In such embodiments, the polyolefin melt index may be increased by at least about 25%. In such embodiments, the normalized catalyst activity may be decreased by less than about 10%. In such embodiments, the MIM may be characterized by the general formula $R^1$—HC=CH—$R^2$ or $R^3R^4C$=$CH_2$ where $R^1$, $R^2$, $R^3$, $R^4$ are each independently selected from the group consisting of a non-aromatic organyl group. In such embodiments, the increase in polyolefin melt index and decrease in normalized catalyst activity are in comparison to the values obtained for these parameters when using an otherwise similar process carried out in the absence of the MIM. In such embodiments, less than about 15% of the MIM may be consumed. In such embodiments, a vapor pressure of the MIM in the reactor does not exceed a vapor pressure of the diluent in the reactor by more than about 20%. In such embodiments, the MIM may be present in an amount of from about 1 wppm to about 10,000 wppm. In such embodiments, the MIM may comprise 2-butene, isobutene, or combinations thereof. In such embodiments, the 2-butene may comprise a mixture of cis-2-butene and trans-2-butene. In such embodiments, the polyolefin may display a decrease in density of less than about 0.01 g/ml when compared to an otherwise similar polyolefin produced in the absence of the MIM. In such embodiments, the polyolefin may display an increase in melt index (MI) of at least about 50% when compared to an otherwise similar polyolefin produced in the absence of the MIM. In such embodiments, the olefin may comprise ethylene and the polyolefin may comprise polyethylene. In such embodiments, the catalyst may comprise chromium. In various embodiments, an article is produced from the polyolefin produced by the methods disclosed herein. In such embodiments, the olefin may comprise ethylene and the polyolefin may comprise a copolymer of ethylene and 1-hexene. In such embodiments, the shear response of the polyolefin may differ from the shear response of an otherwise similar polyolefin prepared in the absence of the MIM by equal to or less than about 15%.

The following enumerated embodiments are provided as non-limiting examples:

1. A method, comprising contacting an olefin, a catalyst, a diluent, and at least one melt index modifier (MIM) in a polymerization reactor under conditions suitable to form a polyolefin and recovering the polyolefin, wherein the polyolefin melt index is increased by at least about 25%, wherein the normalized catalyst activity is decreased by less than about 10%, and wherein the MIM is characterized by the general formula $R^1$—HC=CH—$R^2$ or $R^3R^4C$=$CH_2$ where $R^1$, $R^2$, $R^3$, $R^4$ are each independently selected from the group consisting of a non-aromatic organyl group and where the increase in polyolefin melt index and decrease in normalized catalyst activity are in comparison to the values obtained for these parameters when using an otherwise similar process carried out in the absence of the MIM.

2. The method of embodiment 1, wherein less than about 15% of the MIM is consumed.

3. The method of embodiment 1 or 2, wherein a vapor pressure of the MIM in the reactor does not exceed a vapor pressure of the diluent in the reactor by more than about 20%.
4. The method of embodiment 1, 2, or 3, wherein the MIM is present in an amount of from about 1 wppm to about 10,000 wppm.
5. The method of embodiment 1, 2, 3, or 4, wherein the MIM comprises 2-butene, isobutene, or combinations thereof.
6. The method of embodiment 5, wherein the 2-butene comprises a mixture of cis-2-butene and trans-2-butene.
7. The method of embodiment 1, 2, 3, 4, 5, or 6, wherein the polyolefin displays a decrease in density of less than about 0.01 g/ml when compared to an otherwise similar polyolefin produced in the absence of the MIM.
8. The method of embodiment 1, 2, 3, 4, 5, 6, or 7, wherein the polyolefin displays an increase in melt index (MI) of at least about 50% when compared to an otherwise similar polyolefin produced in the absence of the MIM.
9. The method of embodiment 1, 2, 3, 4, 5, 6, 7, or 8, wherein the olefin comprises ethylene and the polyolefin comprises polyethylene.
10. The method of embodiment 1, 2, 3, 4, 5, 6, 7, 8, or 9, wherein the catalyst comprises chromium.
11. An article produced from the polyolefin of embodiment 1, 2, 3, 4, 5, 6, 7, 8, 9, or 10.
12. A method, comprising: contacting an olefin, a catalyst and a melt index modifier (MIM) in a polymerization reactor under conditions suitable to form a polyolefin and recovering the polyolefin, wherein the MIM is used in an amount effective to modify the melt index of the polyolefin; lower a normalized catalyst activity by less than about 10%; increase a saturation pressure in the polymerization reactor by less than about 20%; and lower a polyolefin density by less than about 0.01 g/ml; where the change in the melt index of the polyolefin, decrease in normalized catalyst activity, increase in saturation pressure, decrease in polyolefin density, or any combination thereof are in comparison to the values obtained for these parameters when using an otherwise similar process carried out in the absence of the MIM.
13. The method of embodiment 12, wherein the MIM is characterized by the general formula $R^1$—HC=CH—$R^2$ or $R^3R^4C$=CH$_2$ where $R^1$, $R^2$, $R^3$, $R^4$ are each selected from the group consisting of a non-aromatic organyl group.
14. The method of embodiment 12 or 13, wherein less than about 15% of the MIM is consumed.
15. The method of embodiment 12, 13, or 14, wherein the MIM is present in the reactor in an amount of from about 1 wppm to about 10,000 wppm.
16. The method of embodiment 12, 13, 14, or 15, wherein the MIM comprises 2-butene, isobutene, or combinations thereof.
17. The method of embodiment 16, wherein the 2-butene comprises a mixture of cis-2-butene and trans-2-butene.
18. The method of embodiment 1, 2, 3, 4, 5, 6, 7, 8, 9, 10, 12, 13, 14, 15, 16, or 17, wherein the olefin comprises ethylene and the polyolefin comprises a copolymer of ethylene and 1-hexene.
19. The method of embodiment 1, 2, 3, 4, 5, 6, 7, 8, 9, 10, 12, 13, 14, 15, 16, or 17, wherein a shear response of the polyolefin differs from a shear response of an otherwise similar polyolefin prepared in the absence of the MIM by equal to or less than about 15%.
20. The method of embodiment 18, wherein a shear response of the polyolefin differs from a shear response of an otherwise similar polyolefin prepared in the absence of the MIM by equal to or less than about 15%.

While embodiments of the invention have been shown and described, modifications thereof can be made without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc., should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method, comprising contacting an olefin, a catalyst, a diluent, and at least one melt index modifier (MIM) in a polymerization reactor under conditions suitable to form a polyolefin and recovering the polyolefin, wherein the polyolefin melt index is increased by at least about 50%, wherein the normalized catalyst activity is decreased by less than 10%, and wherein the MIM is characterized by the general formula $R^1$—HC=CH—$R^2$ or $R^3R^4C$=CH$_2$ where $R^1$, $R^2$, $R^3$, $R^4$ are each independently selected from the group consisting of a non-aromatic organyl group and where the increase in polyolefin melt index and decrease in normalized catalyst activity are in comparison to the values obtained for these parameters when using an otherwise similar process carried out in the absence of the MIM.

2. The method of claim 1, wherein less than 15% of the MIM is consumed.

3. The method of claim 1, wherein a vapor pressure of the MIM in the reactor does not exceed a vapor pressure of the diluent in the reactor by more than 20%.

4. The method of claim 1, wherein the MIM is present in an amount of from about 1 wppm to about 10,000 wppm.

5. The method of claim 1, wherein the MIM comprises 2-butene, isobutene, or combinations thereof.

6. The method of claim 5, wherein the 2-butene comprises a mixture of cis-2-butene and trans-2-butene.

7. The method of claim 1, wherein the polyolefin displays a decrease in density of less than 0.01 g/ml when compared to an otherwise similar polyolefin produced in the absence of the MIM.

8. The method of claim 1, wherein the olefin comprises ethylene and the polyolefin comprises polyethylene.

9. The method of claim 1, wherein the catalyst comprises chromium.

10. A method, comprising: contacting an olefin, a catalyst and a melt index modifier (MIM) in a polymerization reactor under conditions suitable to form a polyolefin and recovering the polyolefin, wherein the MIM is used in an amount effective to modify the melt index of the polyolefin; lower a normalized catalyst activity by less than 10%; increase a saturation pressure in the polymerization reactor by less than 20%; and lower a polyolefin density by less than 0.01 g/ml; where the change in the melt index of the polyolefin, decrease in normalized catalyst activity, increase in saturation pressure, decrease in polyolefin density, or any combination thereof are in comparison to the values obtained for these parameters when using an otherwise similar process carried out in the absence of the MIM wherein the polyolefin displays an increase in melt index (MI) of at least 50% when compared to an otherwise similar polyolefin produced in the absence of the MIM.

11. The method of claim 10, wherein the MIM is characterized by the general formula $R^1—HC=CH—R^2$ or $R^3R^4C=CH_2$ where $R^1$, $R^2$, $R^3$, $R^4$ are each selected from the group consisting of a non-aromatic organyl group.

12. The method of claim 10, wherein less than 15% of the MIM is consumed.

13. The method of claim 10, wherein the MIM is present in the reactor in an amount of from about 1 wppm to about 10,000 wppm.

14. The method of claim 10, wherein the MIM comprises 2-butene, isobutene, or combinations thereof.

15. The method of claim 14, wherein the 2-butene comprises a mixture of cis-2-butene and trans-2-butene.

16. The method of claim 10, wherein the olefin comprises ethylene and the polyolefin comprises a copolymer of ethylene and 1-hexene.

17. The method of claim 10, wherein a shear response of the polyolefin differs from a shear response of an otherwise similar polyolefin prepared in the absence of the MIM by equal to or less than 15%.

18. The method of claim 16, wherein a shear response of the polyolefin differs from a shear response of an otherwise similar polyolefin prepared in the absence of the MIM by equal to or less than 15%.

* * * * *